US012662012B2

(12) United States Patent
Ono

(10) Patent No.: US 12,662,012 B2
(45) Date of Patent: Jun. 23, 2026

(54) VEHICLE CONTROLLER, VEHICLE INCLUDING THE SAME, AND METHOD FOR CONTROLLING VEHICLE

(71) Applicant: TOYOTA JIDOSHA KABUSHIKI KAISHA, Toyota (JP)

(72) Inventor: Tomoya Ono, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 201 days.

(21) Appl. No.: 18/467,256

(22) Filed: Sep. 14, 2023

(65) Prior Publication Data

US 2024/0109452 A1     Apr. 4, 2024

(30) Foreign Application Priority Data

Sep. 30, 2022     (JP) ................................. 2022-158108

(51) Int. Cl.
  *B60L 53/66*     (2019.01)
  *B60L 53/62*     (2019.01)
  *B60L 53/65*     (2019.01)
(52) U.S. Cl.
  CPC ............... *B60L 53/66* (2019.02); *B60L 53/62* (2019.02); *B60L 53/65* (2019.02)
(58) Field of Classification Search
  CPC ....................................................... B60L 53/66
  See application file for complete search history.

(56) References Cited

U.S. PATENT DOCUMENTS

| | | | | |
|---|---|---|---|---|
| 10,173,544 B2 * | 1/2019 | Hendrix | ................ | B60L 53/305 |
| 11,538,042 B2 * | 12/2022 | Pickering | ............. | G06K 19/145 |
| 11,593,564 B2 * | 2/2023 | Schick | ................... | G06Q 10/10 |
| 11,651,160 B2 * | 5/2023 | Schick | ................... | G06F 40/56 |
| | | | | 704/9 |
| 11,750,486 B2 * | 9/2023 | Turow | ................. | H04L 43/045 |
| | | | | 709/224 |

(Continued)

FOREIGN PATENT DOCUMENTS

| | | | | |
|---|---|---|---|---|
| CA | 2740460 C | * | 2/2014 | ............. B60L 53/18 |
| JP | 2020108244 A | | 7/2020 | |
| JP | 2020127296 A | | 8/2020 | |

OTHER PUBLICATIONS

Google Patents Machine Translation of CA2740460C to Hagenmaier et al. (Year: 2011).*

(Continued)

*Primary Examiner* — Jean Paul Cass
(74) *Attorney, Agent, or Firm* — Dinsmore & Shohl LLP

(57) ABSTRACT

An ECU includes a processor that controls transmission and reception of signals between a vehicle and a charging facility in accordance with a communication sequence defined in a charging standard. The processor transmits, to the charging facility, a regular signal for obtaining a charging permission from the charging facility, prior to a start of electric power supply from the charging facility to the vehicle. The processor starts charging control of a battery by the electric power supply from the charging facility, when the charging permission is obtained, and transmits, to the charging facility, a retry signal in which a part of the regular signal is modified in order to retry to obtain the charging permission, when the charging permission is not obtained.

15 Claims, 12 Drawing Sheets

(56)  References Cited

U.S. PATENT DOCUMENTS

| | | | |
|---|---|---|---|
| 11,783,309 B2 * | 10/2023 | Ravinathan ........ | G06Q 20/3224 |
| | | | 705/44 |
| 11,847,237 B1 * | 12/2023 | Attfield ................. | G06F 21/572 |
| 11,861,572 B2 * | 1/2024 | Berman ............... | G06Q 20/308 |
| 11,954,680 B2 * | 4/2024 | Phillips .............. | G07C 9/00563 |
| 2013/0085696 A1 * | 4/2013 | Xu ........................... | B60L 58/16 |
| | | | 702/63 |
| 2014/0088896 A1 * | 3/2014 | Hu ..................... | G01R 31/3835 |
| | | | 702/63 |
| 2015/0278810 A1 * | 10/2015 | Ramatchandirane ......................... | |
| | | | G06Q 20/4015 |
| | | | 705/16 |
| 2018/0229617 A1 * | 8/2018 | Hendrix .................. | B60L 53/60 |
| 2020/0207232 A1 | 7/2020 | Niwa | |
| 2020/0247262 A1 | 8/2020 | Takayama | |
| 2020/0286077 A1 * | 9/2020 | Berman ............... | G06Q 20/327 |
| 2024/0042875 A1 * | 2/2024 | Podhola ................. | B60L 53/30 |

OTHER PUBLICATIONS

Charge X Recommended Practices for Seamless retry for electric charging CHARGE X 2024.*

Open Charge Alliance (OCA), "Open Charge Point Protocol", Jun. 1, 2020 (Jun. 1, 2020), URL: https://openchargealliance.org/my-oca/ocpp/ [retrieved on Jan. 26, 2024].

* cited by examiner

FIG.1
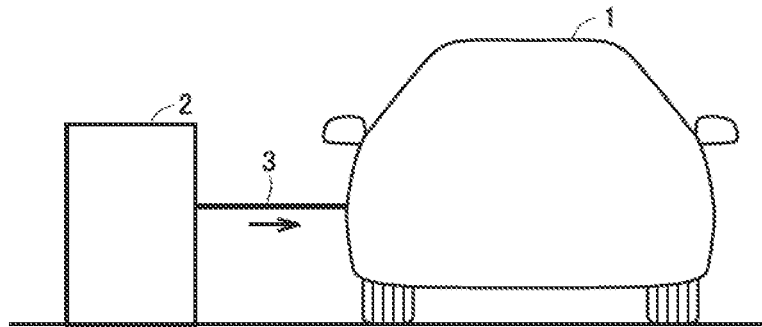

FIG.5

| n-TH RETRY SIGNAL | FEATURE |
|---|---|
| FIRST RETRY SIGNAL | TRANSMITTED WITH ZERO ASSIGNED TO PAYLOAD OF DISCHARGING FRAME |
| SECOND RETRY SIGNAL | DISCHARGING FRAME IS NOT TRANSMITTED |
| THIRD RETRY SIGNAL | TRANSMITTED WITH ZERO ASSIGNED TO OPTIONAL ITEM |
| FOURTH RETRY SIGNAL | OPTIONAL FRAME IS NOT TRANSMITTED |
| FIFTH RETRY SIGNAL | TRANSMITTED WITH VALUE OF CONVENTIONAL STANDARD ASSIGNED |

FIG.8

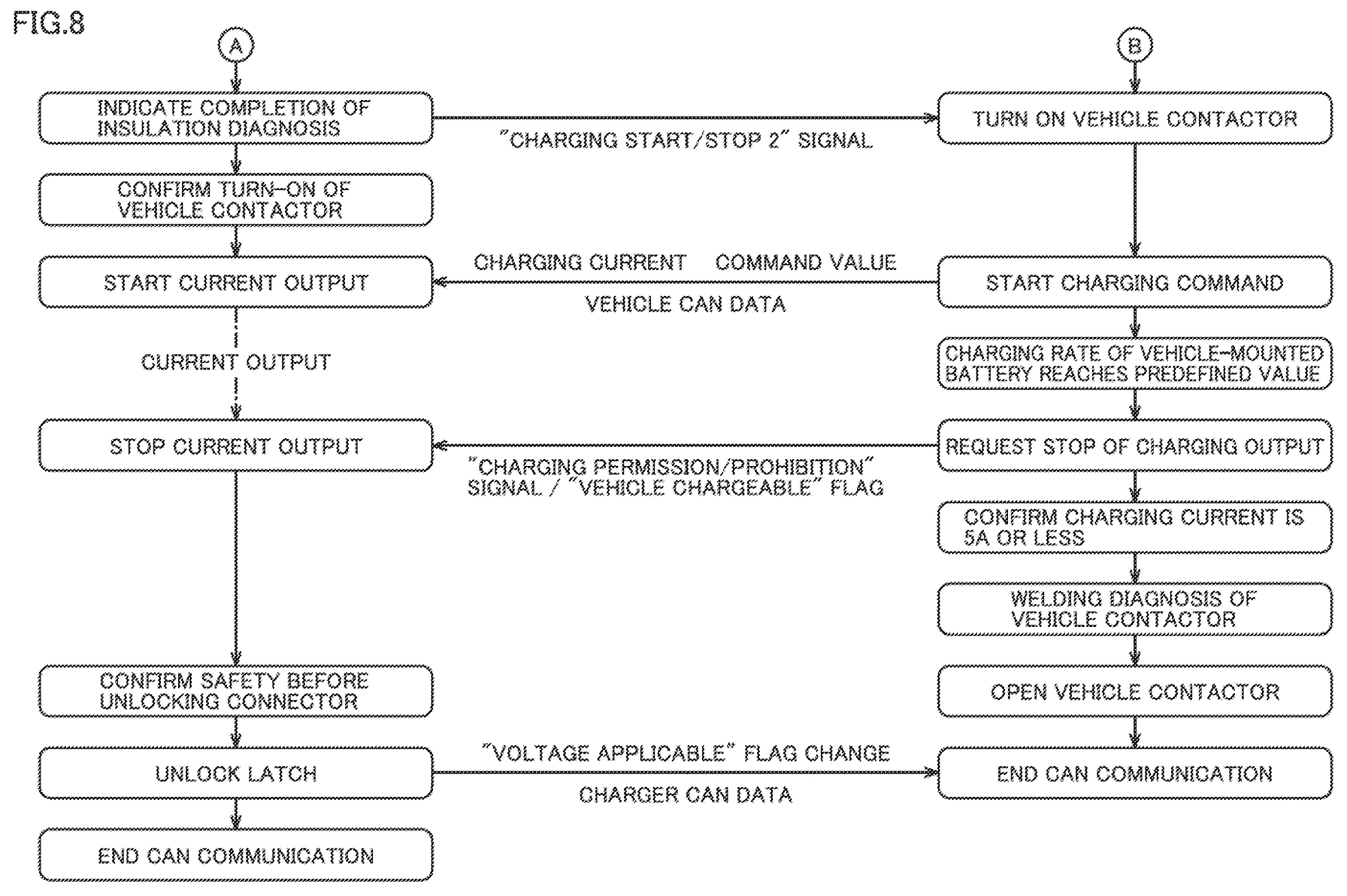

(A) → INDICATE COMPLETION OF INSULATION DIAGNOSIS (B) → TURN ON VEHICLE CONTACTOR

"CHARGING START/STOP 2" SIGNAL

CONFIRM TURN-ON OF VEHICLE CONTACTOR

START CURRENT OUTPUT → START CHARGING COMMAND

CHARGING CURRENT COMMAND VALUE

VEHICLE CAN DATA

CURRENT OUTPUT

CHARGING RATE OF VEHICLE-MOUNTED BATTERY REACHES PREDEFINED VALUE

STOP CURRENT OUTPUT → REQUEST STOP OF CHARGING OUTPUT

"CHARGING PERMISSION/PROHIBITION" SIGNAL / "VEHICLE CHARGEABLE" FLAG

CONFIRM CHARGING CURRENT IS 5A OR LESS

WELDING DIAGNOSIS OF VEHICLE CONTACTOR

CONFIRM SAFETY BEFORE UNLOCKING CONNECTOR → OPEN VEHICLE CONTACTOR

"VOLTAGE APPLICABLE" FLAG CHANGE

CHARGER CAN DATA

UNLOCK LATCH → END CAN COMMUNICATION

END CAN COMMUNICATION

FIG.9

| SOF | ID | RTR | CONTROL FIELD | DATA FIELD | CRC | ACK | EOF |
|-----|----|----|---------------|------------|-----|-----|-----|

FIG.10

| SENDER | RECEIVER | ID(H') | Byte | DATA FIELD |
|---|---|---|---|---|
| VEHICLE | CHARGING FACILITY | 100 | 0 | MINIMUM CHARGING CURRENT VALUE |
| | | | 1, 2, 3 | |
| | | | 4, 5 | BATTERY STRENGTH UPPER LIMIT VALUE |
| | | | 6 | TOTAL BATTERY CAPACITY |
| | | | 7 | |
| | | 101 | 0 | |
| | | | 1 | MAXIMUM CHARGING TIME |
| | | | 2 | MAXIMUM CHARGING TIME (EXTENDED) |
| | | | 3 | |
| | | | 4 | |
| | | | 5, 6 | |
| | | | 7 | |
| | | 102 | 0 | CHAdeMO CHARGING SEQUENCE MANAGEMENT NUMBER |
| | | | 1, 2 | CHARGING VOLTAGE UPPER LIMIT VALUE |
| | | | 3 | CHARGING CURRENT UPPER LIMIT VALUE |
| | | | 4 | FAULT FLAG |
| | | | 5 | STATE DISPLAY FLAG |
| | | | 6 | REMAINING BATTERY CAPACITY |
| | | | 7 | |
| | | 200 | 0 | DISCHARGING CURRENT UPPER LIMIT VALUE |
| | | | 1, 2, 3 | |
| | | | 4, 5 | DISCHARGING VOLTAGE LOWER LIMIT VALUE |
| | | | 6 | DISCHARGING LOWER LIMIT OF REMAINING BATTERY CAPACITY |
| | | | 7 | CHARGING UPPER LIMIT OF REMAINING BATTERY CAPACITY (OPTIONAL) |
| | | 201 | 0 | V2H CHARGING/DISCHARGING SEQUENCE MANAGEMENT NUMBER |
| | | | 1, 2 | ESTIMATED COMPLETION TIME OF DISCHARGING (OPTIONAL) |
| | | | 3, 4 | AMOUNT OF ELECTRIC POWER THAT CAN BE SUPPLIED BY VEHICLE (OPTIONAL) |
| | | | 5, 6, 7 | |

FIG.11

| ID (H') | Byte (Bit) | ITEM NAME | DESCRIPTION | PROCESS OF VEHICLE | PROCESS OF CHARGING FACILITY (EVPS) |
|---|---|---|---|---|---|
| 200 | 0 | DISCHARGING CURRENT UPPER LIMIT VALUE | UPPER LIMIT VALUE OF DISCHARGING CURRENT PERMITTED BY VEHICLE FOR EVPS | SET VALUE DEPENDING ON BATTERY STATE OF VEHICLE IN CONSIDERATION OF FOLLOWING CONDITIONS. | •DISCHARGE CURRENT USING THIS VALUE AS UPPER LIMIT DURING V2H CHARGING/DISCHARGING MODE. •EVPS DOES NOT USE DISCHARGING CURRENT UPPER LIMIT VALUE, EVEN IF IT IS LARGER THAN INPUTTABLE CURRENT VALUE, TO MAKE DECISION TO STOP. |
| | 1-3 | SPARE | | | |
| | 4,5 | DISCHARGING VOLTAGE LOWER LIMIT VALUE | LOWER LIMIT VOLTAGE VALUE AT WHICH VEHICLE CAN DISCHARGE | SET MINIMUM VOLTAGE VALUE AT WHICH VEHICLE PERMITS DISCHARGING. | USE THIS VALUE TO CALCULATE ABNORMALITY DETERMINATION VOLTAGE LOWER LIMIT VALUE. |
| | 6 | DISCHARGING LOWER LIMIT OF REMAINING BATTERY CAPACITY | LOWER LIMIT VALUE OF BATTERY CAPACITY AT WHICH VEHICLE PERMITS DISCHARGING | SET DISCHARGING LOWER LIMIT VALUE OF VEHICLE-MOUNTED BATTERY. | WHEN THIS VALUE IS REACHED, EVPS PROHIBITS ONLY DISCHARGING (CHARGING CAN CONTINUE). |
| | 7 | CHARGING UPPER LIMIT OF REMAINING BATTERY CAPACITY (OPTIONAL) | UPPER LIMIT VALUE OF BATTERY CAPACITY AT WHICH VEHICLE PERMITS CHARGING | SET CHARGING UPPER LIMIT VALUE OF VEHICLE-MOUNTED BATTERY. | WHEN THIS VALUE IS REACHED, EVPS PROHIBITS ONLY CHARGING (DISCHARGING CAN CONTINUE). |
| 201 | 0 | V2H CHARGING/DISCHARGING SEQUENCE MANAGEMENT NUMBER | NUMBER INDICATING V2H CHARGING/DISCHARGING SEQUENCE CONTENT CORRESPONDING TO VEHICLE | SET NUMBER DEFINED IN V2H GUIDELINES. | USE THIS NUMBER FOR SEQUENCE SWITCHING OF V2H CHARGING/DISCHARGING SEQUENCE. |
| | 1,2 | ESTIMATED COMPLETION TIME OF DISCHARGING (OPTIONAL) | ESTIMATED TIME UNTIL COMPLETION OF DISCHARGING CALCULATED BY VEHICLE (FOR DISPLAY) | SET TIME DURING WHICH DISCHARGING CAN CONTINUE AT CURRENT LOAD OR PREDETERMINED LOAD (CONDITION DEFINED BY VEHICLE MANUFACTURER). | INDICATE TO USER THAT THIS IS ESTIMATE. |
| | 3,4 | AMOUNT OF ELECTRIC POWER THAT CAN BE SUPPLIED BY VEHICLE (OPTIONAL) | AMOUNT OF ELECTRIC POWER THAT CAN BE FED BY VEHICLE (FOR DISPLAY) | SET AMOUNT OF ELECTRIC POWER THAT CAN BE FED FROM VEHICLE, SUCH AS POWER GENERATED FROM STORAGE BATTERY, FUEL CELL, GASOLINE, ETC. | INDICATE TO USER THAT THIS IS ESTIMATE. |
| | 5-7 | SPARE | | | |

FIG.12

| ID (H') | Period (ms) | DLC | Byte | Bit | DATA FIELD |
|---|---|---|---|---|---|
| 710 | 100 | 8 | 0 | 7~0 | VEHICLE ID |
|  |  |  | 1 | 7~0 |  |
|  |  |  | 2 | 7~0 |  |
|  |  |  | 3 | 7~0 |  |
|  |  |  | 4 | 7~0 |  |
|  |  |  | 5 | 7~0 |  |
|  |  |  | 6 | 7~0 |  |
|  |  |  | 7 | 7~0 |  |
| 711 | 100 | 8 | 0 | 7~0 | VEHICLE ID |
|  |  |  | 1 | 7~0 |  |
|  |  |  | 2 | 7~0 |  |
|  |  |  | 3 | 7~0 |  |
|  |  |  | 4 | 7~0 |  |
|  |  |  | 5 | 7~0 |  |
|  |  |  | 6 | 7~0 |  |
|  |  |  | 7 | 7~0 |  |
| 712 | 100 | 8 | 0 | 7~0 | VEHICLE ID |
|  |  |  | 1 | 7~0 |  |
|  |  |  | 2 | 7~0 |  |
|  |  |  | 3 | 7~0 |  |
|  |  |  | 4 | 7~0 |  |
|  |  |  | 5 | 7~0 |  |
|  |  |  | 6 | 7~0 |  |
|  |  |  | 7 | 7~0 |  |
| 718 | 100 | 8 | 0 | 7~0 | SERVICE CODE |
|  |  |  | 1 | 7~0 |  |
|  |  |  | 2 | 7~0 | ‑ |
|  |  |  | 3 | 7~0 |  |
|  |  |  | 4 | 7~0 |  |
|  |  |  | 5 | 7~0 |  |
|  |  |  | 6 | 7~0 |  |
|  |  |  | 7 | 7~0 |  |

VEHICLE CONTROLLER, VEHICLE INCLUDING THE SAME, AND METHOD FOR CONTROLLING VEHICLE

CROSS REFERENCE TO RELATED APPLICATIONS

This nonprovisional application is based on Japanese Patent Application No. 2022-158108 filed on Sep. 30, 2022 with the Japan Patent Office, the entire contents of which are hereby incorporated by reference.

BACKGROUND

Field

The present disclosure relates to a vehicle controller, a vehicle including the same, and a method for controlling a vehicle, and more particularly to a technique for charging a power storage device mounted on a vehicle with electric power supplied from a charging facility provided outside the vehicle.

Description of the Background Art

A vehicle controller disclosed in Japanese Patent Laying-Open No. 2020-127296 includes an input/output unit configured to input/output signals transmitted and received between a vehicle and a charger, and a control unit that controls the transmission and reception of signals through the input/output unit in accordance with a predefined communication sequence for charging a power storage device. The communication sequence specifies that the vehicle should proceed with the communication sequence based on the content of a signal received by the vehicle from the charger. When the signal received from the charger is a predetermined specific signal, the control unit proceeds with the communication sequence regardless of the content of the specific signal.

SUMMARY

Generally, charging of vehicles such as battery electric vehicles and plug-in hybrid electric vehicles is carried out by the vehicle and a charging facility working together to perform a series of processes defined in a charging standard. In doing so, various types of signals are transmitted and received between the vehicle and the charging facility in accordance with a communication sequence defined in the charging standard. By executing the communication sequence, the vehicle and the charging facility can establish a communication link, determine a charging condition, and mutually confirm the success or failure of preparation for charging.

There are a wide variety of charging facilities on the market. Some charging facilities may not be able to charge a vehicle due to interconnectivity between the vehicle and the charging facility. More specifically, even if the vehicle is transmitting and receiving signals in accordance with a communication sequence defined in a charging standard, charging may not be permitted due to factors on the part of the charging facility. It is speculated that a major factor responsible for reduced interconnectivity in this case is that some manufacturers of charging facilities adopt their own criteria for charging standards or have their own interpretations of charging standards. For the convenience of vehicle users, it is desirable to enable charging of a vehicle at as many charging facilities as possible.

The present disclosure was made to solve such a problem, and one object of the present disclosure is to enable charging of a vehicle at many charging facilities.

(1) A vehicle controller according to an aspect of the present disclosure performs control for charging a power storage device mounted on a vehicle with electric power supplied from a charging facility provided outside the vehicle. The vehicle controller includes a processor that controls transmission and reception of signals to and from the charging facility in accordance with a communication sequence defined in a charging standard. The processor transmits, to the charging facility, a first signal for obtaining a charging permission from the charging facility, prior to a start of electric power supply from the charging facility to the vehicle. The first signal includes a charging frame indicating a charging condition from the charging facility to the vehicle. The processor starts charging control of the power storage device by the electric power supply from the charging facility, when the charging permission is obtained, and transmits, to the charging facility, a second signal in which a part of the first signal is modified in order to retry to obtain the charging permission, when the charging permission is not obtained.

(2) The first signal further includes a discharging frame indicating a discharging condition from the vehicle to the charging facility. A difference between the first signal and the second signal is the discharging frame. (3) The second signal includes the charging frame and the discharging frame. The discharging condition in the second signal is set to an invalid value. (4) The second signal includes the charging frame, and does not include the discharging frame. (5) The discharging condition includes at least one of a lower limit value of a discharging voltage, an upper limit value of a discharging current, a discharging lower limit of remaining battery capacity, and a discharging sequence management number, each of which is defined in the charging standard.

(6) The first signal further includes an optional frame indicating an optional condition defined as not being essential in the charging standard. A difference between the first signal and the second signal is the optional frame. (7) The second signal includes the charging frame and the optional frame. The optional condition in the second signal is set to an invalid value. (8) The second signal includes the charging frame, and does not include the optional frame. (9) The optional condition includes at least one of an identification number and a service code of the vehicle.

(10) The first signal further includes a discharging frame indicating a discharging condition from the vehicle to the charging facility. At least one of the charging condition and the discharging condition in the first signal includes an optional item defined as not being essential in the charging standard. A difference between the first signal and the second signal is the optional item. (11) The second signal includes the charging frame and the discharging frame. The optional item in the second signal is set to an invalid value. (12) The optional item includes at least one of a charging upper limit of remaining battery capacity, an estimated completion time of discharging, and an amount of electric power that can be supplied by the vehicle.

(13) A difference between the first signal and the second signal is a difference between information defined in the charging standard and information defined in a conventional standard that was standardized before the charging standard. (14) The first signal includes a charging sequence management number of the charging standard. The second signal includes a charging sequence management number of the conventional standard. (15) The first signal includes at least one of an upper limit value of a charging voltage and an upper limit value of a charging current, each of which is defined in the charging standard. The second signal includes at least one of an upper limit value of a charging voltage and an upper limit value of a charging current, each of which is defined in the conventional standard.

In the configuration of (1) described above, when the charging permission is not obtained, the second signal is transmitted to the charging facility, to retry to obtain the charging permission. The second signal is a signal in which a part of the first signal is modified, as described in (2) to (15) above. If the charging facility is able to process the second signal, interconnectivity between the vehicle and the charging facility may be ensured, and the charging facility may give the charging permission to the vehicle. According to the configuration of (1) described above, therefore, the vehicle can be charged at many charging facilities.

(16) The processor transmits a third signal to the charging facility, when the charging permission is not obtained even after the second signal is transmitted to the charging facility, transmits a fourth signal to the charging facility, when the charging permission is not obtained even after the third signal is transmitted to the charging facility, and transmits a fifth signal to the charging facility, when the charging permission is not obtained even after the fourth signal is transmitted to the charging facility. The first signal further includes a discharging frame indicating a discharging condition from the vehicle to the charging facility, and an optional frame indicating an optional condition defined as not being essential in the charging standard. At least one of the charging condition and the discharging condition in the first signal includes an optional item defined as not being essential in the charging standard. A difference between the first signal and the second signal is the discharging frame. A difference between the first signal and the third signal is the optional frame or the optional item. A difference between the first signal and the fourth signal is a difference between information defined in the charging standard and information defined in a conventional standard that was standardized before the charging standard.

In the configuration of (16) described above, when charging permission is not obtained, not only the second signal but also the third and fourth signals are transmitted. As will be described in detail later, the second to fourth signals are transmitted in descending order of probability of being processed by the charging facility. According to the configuration of (16) described above, therefore, the vehicle can be charged at even more charging facilities.

(17) A vehicle according to another aspect of the present disclosure includes the vehicle controller of (1) described above.

According to the configuration of (17) described above, a vehicle that can be charged at many charging facilities can be provided.

(18) A method for controlling a vehicle according to yet another aspect of the present disclosure charges a power storage device mounted on the vehicle with electric power supplied from a charging facility provided outside the vehicle. The method for controlling a vehicle includes transmitting and receiving signals between the vehicle and the charging facility in accordance with a communication sequence defined in a charging standard. The transmitting and receiving includes first to third steps. The first step is transmitting, from the vehicle to the charging facility, a first signal for obtaining a charging permission from the charging facility, prior to a start of electric power supply from the charging facility to the vehicle. The second step is starting the electric power supply from the charging facility, when the vehicle obtains the charging permission. The third step is transmitting, from the vehicle to the charging facility, a second signal in which a part of the first signal is modified in order to retry to obtain the charging permission, when the vehicle does not obtain the charging permission.

According to the method of (18) described above, the vehicle can be charged at many charging facilities, as with the configuration of (1) described above.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 schematically shows an overall configuration of a charging system according to an embodiment of the present disclosure.

FIG. 5 illustrates features of five types of retry signals.

FIG. 8 is a flowchart showing a continuation of the procedure shown in the flowchart of FIG. 7.

FIG. 9 shows an overview of a frame structure in the CAN protocol.

FIG. 10 is a first diagram illustrating an n-th retry signal in this example.

FIG. 11 shows details of a discharging frame.

FIG. 12 is a second diagram illustrating the n-th retry signal in this example.

DESCRIPTION OF THE PREFERRED EMBODIMENTS

Figure 2:
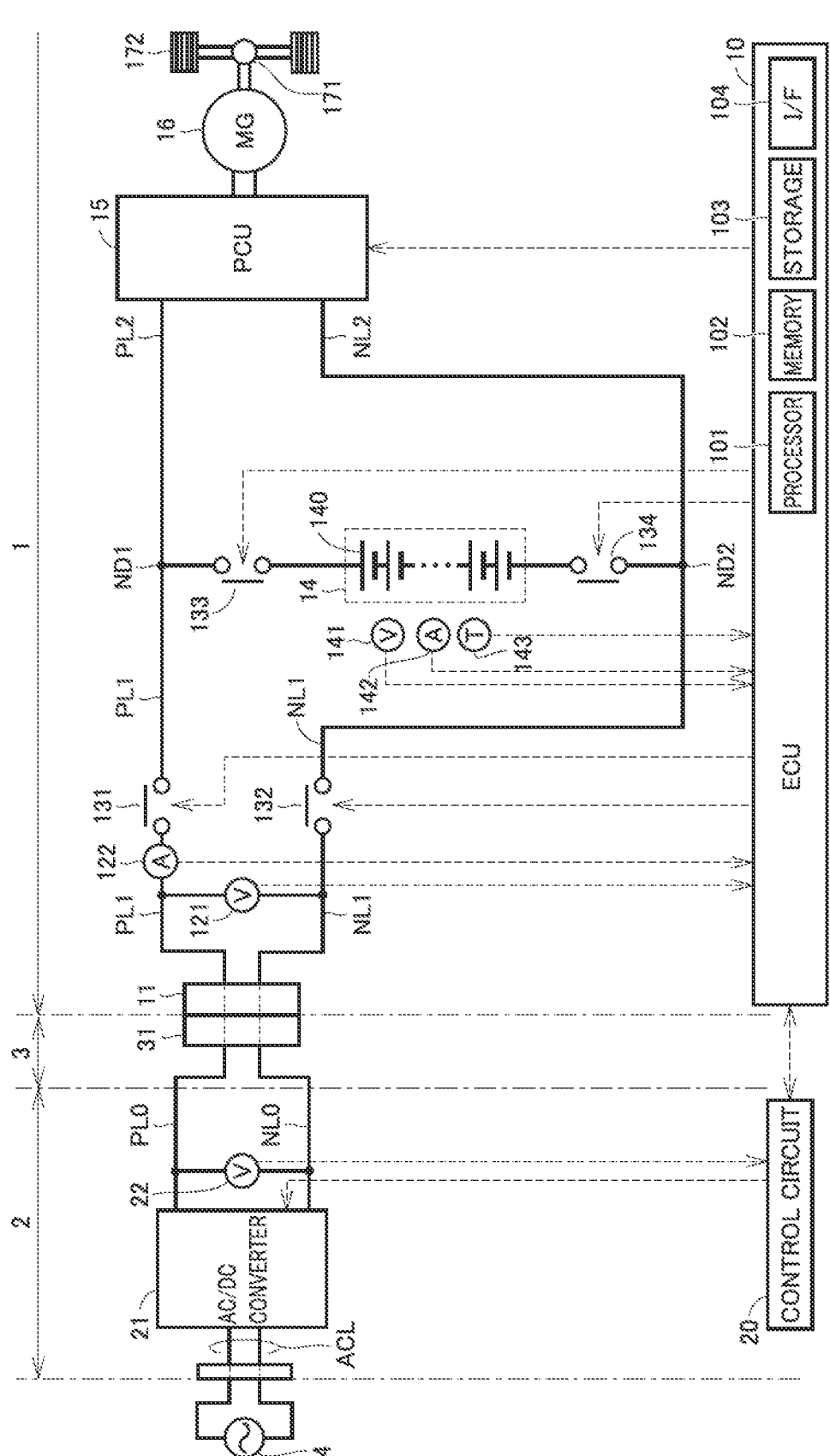
FIG. 2 is a block diagram showing a configuration of a vehicle and a charging facility.

An embodiment of the present disclosure will be described in detail below with reference to the drawings. The same or corresponding portions in the drawings are denoted by the same reference characters and description thereof will not be repeated.

EMBODIMENT

<Overall Configuration of Charging System>

FIG. 1 schematically shows an overall configuration of a charging system according to an embodiment of the present disclosure. A charging system 100 includes a vehicle 1, a charging facility 2, and a charging cable 3. FIG. 1 shows a state in which vehicle 1 and charging facility 2 are electrically connected by charging cable 3. Electric power is supplied from charging facility 2 to vehicle 1 in this state (so-called external charging control).

Vehicle 1 is, for example, a battery electric vehicle (BEV). Vehicle 1 may be, for example, a plug-in hybrid electric vehicle (PHEV) or a fuel cell electric vehicle (FCEV) as long as vehicle 1 is a vehicle configured for external charging.

Charging facility 2 is, for example, an EVPS (Electric Vehicle Power Station) provided in a public charging station. Charging facility 2 is a DC (Direct Current) charger that supports quick charging in this embodiment. The magnitude of electric power supplied from charging facility 2 to vehicle 1 is not particularly limited.

FIG. 2 is a block diagram showing a configuration of vehicle 1 and charging facility 2. Charging facility 2 converts electric power (AC power) supplied from a system power supply 4 into charging power (DC power) of a battery 14 mounted on vehicle 1. Charging facility 2 includes a power line ACL, an AC/DC converter 21, a voltage sensor 22, power feeding lines PL0 and NL0, and a control circuit 20.

Power line ACL transmits the AC power supplied from system power supply 4 to AC/DC converter 21. AC/DC converter 21 converts the AC power on power line ACL into the DC power for charging battery 14 mounted on vehicle 1. The DC power output from AC/DC converter 21 is supplied by power feeding line PL0 on the positive electrode side and power feeding line NL0 on the negative electrode side. Voltage sensor 22 detects a voltage between power feeding line PL0 and power feeding line NL0, and outputs the result of detection to control circuit 20.

Control circuit 20 includes a processor, a memory, a storage, and an input/output interface (none shown). The processor controls communication with vehicle 1 and controls the power conversion operation by AC/DC converter 21 based on the voltage detected by voltage sensor 22, signals from vehicle 1, and data stored in the memory and programs stored in the storage (which may include maps and the like).

Vehicle 1 includes an inlet 11, charging lines PL1 and NL1, a voltage sensor 121, a current sensor 122, charging relays (CHRs) 131 and 132, system main relays (SMRs) 133 and 134, battery 14, power lines PL2 and NL2, a PCU (Power Control Unit) 15, a motor generator (MG) 16, a motive power transmission gear 171, a driving wheel 172, and an ECU (Electronic Control Unit) 10.

A connector 31 of charging cable 3 can be inserted into inlet 11 through mechanical coupling such as fitting. The insertion of connector 31 ensures electrical connection between power feeding line PL0 and a positive-electrode-side contact point of inlet 11, and ensures electrical connection between power feeding line NL0 and a negative-electrode-side contact point of inlet 11. In addition, when inlet 11 and connector 31 are connected by charging cable 3, ECU 10 of vehicle 1 and control circuit 20 of charging facility 2 can mutually exchange various types of signals (requests, commands, messages, frames and the like) by communication in accordance with a communication protocol such as CAN (Controller Area Network).

Voltage sensor 121 is electrically connected on the inlet 11 side relative to charging relays 131 and 132 and between charging line PL1 and charging line NL1. Voltage sensor 121 detects a DC voltage between charging line PL1 and charging line NL1, and outputs the result of detection to ECU 10. Current sensor 122 is provided on charging line PL1, for example. Current sensor 122 detects a current flowing through charging line PL1, and outputs the result of detection to ECU 10. Based on the results of detection by voltage sensor 121 and current sensor 122, ECU 10 can calculate the electric power (amount of charging of battery 14) supplied from charging facility 2.

Charging relay 131 is connected to charging line PL1, and charging relay 132 is connected to charging line NL1. Closing and opening of charging relays 131 and 132 are controlled in accordance with a command from ECU 10. When charging relays 131 and 132 are closed and SMRs 133 and 134 are closed, electric power transmission between inlet 11 and battery 14 becomes possible.

Battery 14 supplies electric power for generating driving force of vehicle 1. Battery 14 also stores electric power generated by motor generator 16. Battery 14 is an assembled battery including a plurality of cells 140. Each cell 140 is a secondary battery such as a lithium ion battery or a nickel-metal hydride battery. It should be noted that battery 14 corresponds to "power storage device" according to the present disclosure. Instead of battery 14, a capacitor such as an electric double layer capacitor may be used as the "power storage device."

Battery 14 has a positive electrode electrically connected to a node ND1 with SMR 133 being interposed. Node ND1 is electrically connected to charging line PL1 and power line PL2. Similarly, battery 14 has a negative electrode electrically connected to a node ND2 with SMR 134 being interposed. Node ND2 is electrically connected to charging line NL1 and power line NL2. Closing and opening of SMRs 133 and 134 are controlled in accordance with a command from ECU 10.

Battery 14 is provided with a voltage sensor 141, a current sensor 142, and a battery temperature sensor 143. Voltage sensor 141 detects a voltage of battery 14. Current sensor 142 detects a current input to and output from battery 14. Battery temperature sensor 143 detects a temperature of battery 14. Each sensor outputs the result of detection to ECU 10. ECU 10 can calculate an SOC (State Of Charge) of battery 14 based on the result of detection by voltage sensor 141 and/or current sensor 142.

PCU 15 is electrically connected between power lines PL2, NL2 and motor generator 16. PCU 15 includes a converter and an inverter (neither shown), and drives motor generator 16 in accordance with a command from ECU 10.

Motor generator 16 is an AC rotating electric machine and is, for example, a permanent magnet-type synchronous motor including a rotor in which a permanent magnet is embedded. The output torque of motor generator 16 is transmitted to driving wheel 172 through motive power transmission gear 171, to thereby cause vehicle 1 to travel. During braking operation of vehicle 1, motor generator 16 can generate electric power by the rotational force of driving wheel 172. The electric power generated by motor generator 16 is converted into the charging power of battery 14 by PCU 15.

ECU 10 includes, like control circuit 20, a processor 101, a memory 102, a storage 103, and an input/output interface 104. Storage 103 is a rewritable nonvolatile memory such as an HDD (Hard Disk Drive), an SSD (Solid State Drive), or a flash memory. Storage 103 stores a system program including an OS (Operating System), and a control program including computer-readable codes required for control operations. Processor 101 is, for example, a CPU (Central Processing Unit) or an MPU (Micro-Processing Unit). Processor 101 reads the system program and the control program, deploys them in memory 102, and executes them, to thereby implement various arithmetic processes related to the control (particularly the external charging control in this embodiment) of vehicle 1. Input/output interface 104 inputs and outputs various types of data between ECU 10 and other devices (charging facility 2 in this example, but a server, a user terminal and the like may also be included). It should be noted that ECU 10 may be divided into a plurality of ECUs for each function.

<Communication Sequence Overview>

In the external charging control, processor 101 of ECU 10 controls transmission and reception of messages to and from charging facility 2 in accordance with a communication sequence defined in a charging standard. An exemplary communication sequence is described below.

Figure 3:
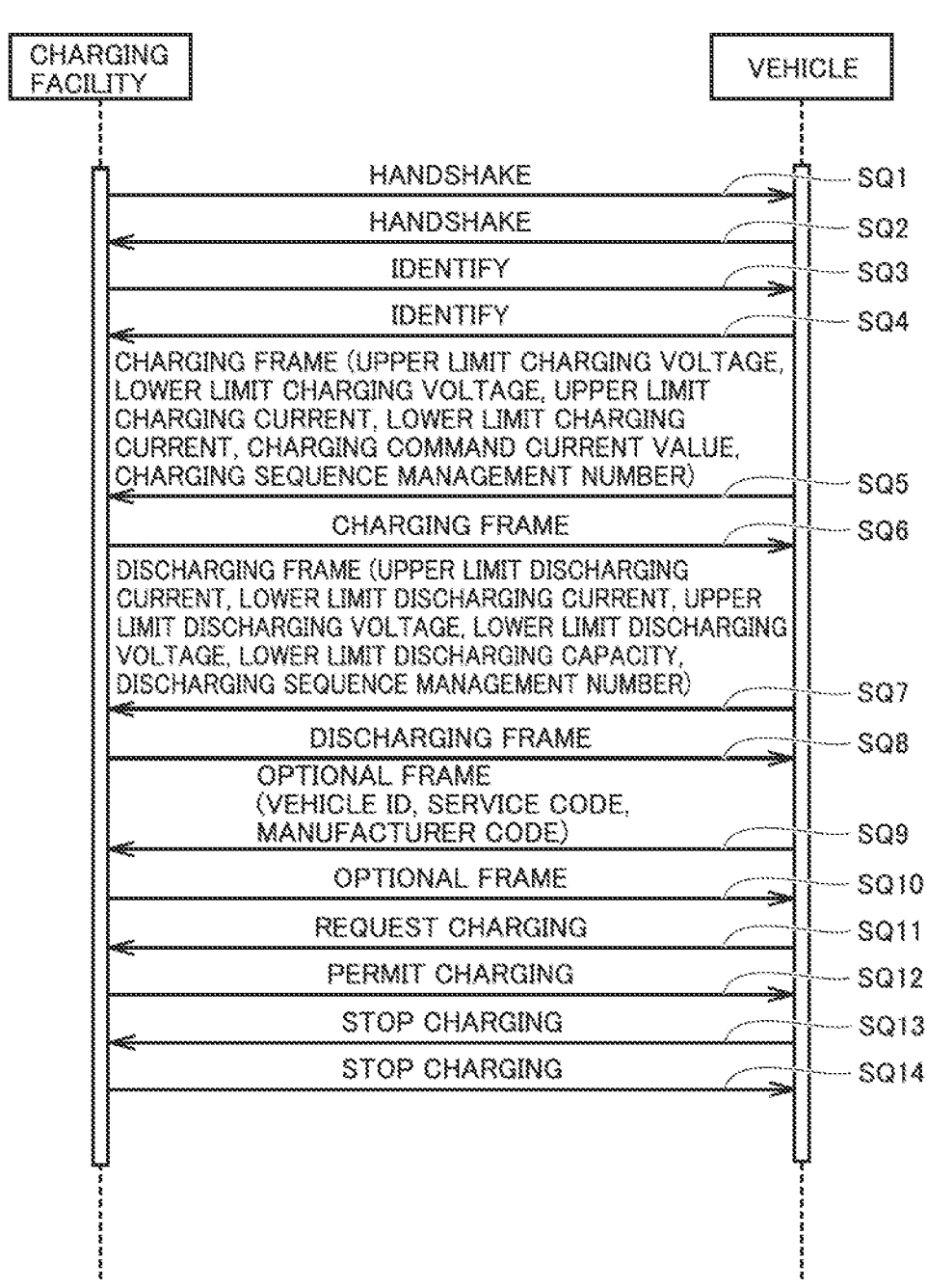
FIG. 3 is a sequence diagram showing an overview of a communication sequence between the vehicle and the charging facility.

FIG. 3 is a sequence diagram showing an overview of a communication sequence between vehicle 1 and charging facility 2. A sequence process performed by control circuit 20 of charging facility 2 is shown on the left side of the figure, and a sequence process performed by ECU 10 of vehicle 1 is shown on the right side. For simplicity, an entity that executes the process performed by ECU10 is described as vehicle 1, and an entity that executes the process performed by control circuit 20 is described as charging facility 2.

The communication sequence shown in FIG. 3 is started when vehicle 1 and charging facility 2 are electrically connected by charging cable 3, and then a low-voltage power supply is turned on for implementing communication between vehicle 1 and charging facility 2.

First, a handshake is performed between vehicle 1 and charging facility 2 (SQ1 and SQ2). A handshake message may include information about a version number of a compliant communication sequence (communication protocol). In addition, messages are transmitted and received between vehicle 1 and charging facility 2 for identifying each other (SQ3 and SQ4). If they successfully identify each other, a communication link is established between vehicle 1 and charging facility 2.

Next, vehicle 1 transmits a "charging frame" to charging facility 2, which indicates a charging condition from charging facility 2 to vehicle 1 (SQ5). The charging condition includes items such as an upper limit charging voltage, a lower limit charging voltage, an upper limit charging current, a lower limit charging current, a charging command current value, and a charging sequence management number. The charging condition may include only some of these items. In response to the charging frame from vehicle 1, charging facility 2 transmits a charging frame to vehicle 1, which indicates a charging condition of charging facility 2 (an electric power supply condition from charging facility 2 to vehicle 1) (SQ6). The charging condition of charging facility 2 may include items similar to those of the charging condition of vehicle 1.

Vehicle 1 then transmits a "discharging frame" to charging facility 2, which indicates a discharging condition from vehicle 1 to charging facility 2 (SQ7). While the discharging frame is used during V2G (Vehicle to Grid) or V2H (Vehicle to Home) operation, the discharging frame may also be transmitted and received when charging vehicle 1. The discharging condition includes items such as an upper limit discharging voltage, a lower limit discharging voltage, an upper limit discharging current, a lower limit discharging current, a lower limit discharging capacity, and a discharging sequence management number. The discharging condition may include only some of these items. In response to the discharging frame from vehicle 1, charging facility 2 transmits a discharging frame to vehicle 1, which indicates a discharging condition of charging facility 2 (an electric power supply condition from vehicle 1 to charging facility 2) (SQ8). The discharging condition of charging facility 2 may include items similar to those of the discharging condition of vehicle 1.

Vehicle 1 further transmits an "optional frame" to charging facility 2, which is defined as not being essential in the charging standard (SQ9). Typically, the optional frame is peripheral information related to the charging and discharging of vehicle 1, and includes items such as an identification code of vehicle 1 (vehicle ID), a service code of vehicle 1, and an identification code of the manufacturer of vehicle 1 (manufacturer code). Similarly, charging facility 2 transmits an optional frame of charging facility 2 to vehicle 1 (SQ10). The optional frame of charging facility 2 may include items similar to those of the optional frame of vehicle 1.

In the example described in FIG. 3, the charging frame, the discharging frame and the optional frame are transmitted in this order. However, it is not essential to transmit the discharging frame and the optional frame. In addition, the charging frame, the discharging frame and the optional frame may be transmitted in other orders. As in an example to be described later, the charging frame, the discharging frame and the optional frame may be collectively transmitted. It has also been mentioned that each frame is transmitted first from vehicle 1 to charging facility 2. However, each frame may be transmitted first from charging facility 2 to vehicle 1.

Once the three types of frames have been transmitted and received and both vehicle 1 and charging facility 2 are ready for charging, vehicle 1 transmits a charging request message to charging facility 2 (SQ11). In response to the charging request message, charging facility 2 transmits a charging permission message to vehicle 1 (SQ12). The preparation for charging is thus completed, and charging of vehicle 1 (electric power supply from charging facility 2 to vehicle 1) is started. It should be noted that the charging permission message may include a message in which charging facility 2 indicates the start of charging.

Subsequently, when a predetermined charging stop condition is satisfied such as when battery 14 reaches a fully charged state, vehicle 1 transmits a charging stop message to charging facility 2 (SQ13). In response to the charging stop message from vehicle 1, charging facility 2 transmits a charging stop message to vehicle 1 (SQ14).

<Reduction in Interconnectivity>

As was described in FIG. 3, a communication sequence defined in a charging standard proceeds while signals (messages, frames and the like) are exchanged basically alternately between vehicle 1 and charging facility 2. Even if vehicle 1 is transmitting signals in accordance with the communication sequence defined in the charging standard, charging may not be permitted because charging facility 2 does not properly process the received signals. It is speculated that a major factor responsible for such reduced interconnectivity is that some of the various charging facilities on the market do not properly comply with charging standards (for example, manufacturers of charging facilities adopt their own criteria for charging standards or have their own interpretations of charging standards). For the convenience of a user of vehicle 1, it is desirable that vehicle 1 can be charged at as many charging facilities 2 as possible.

In this embodiment, therefore, when vehicle 1 does not obtain the charging permission message from charging facility 2, vehicle 1 transmits a "retry signal" to charging facility 2 for retrying to obtain the charging permission message. The retry signal is a signal in which a part of the three types of frames (the charging frame, the discharging frame and the optional frame) is modified. The modification may include change and deletion.

If charging facility 2 is unable to process the first signal including the three types of frames, but is able to properly process the retry signal, the charging permission message may be generated and transmitted from charging facility 2 to vehicle 1. Charging facility 2 can then be used to charge vehicle 1. The process of transmitting the retry signal will be described in detail below with reference to a flowchart.
<Process Flow>

Figure 4:
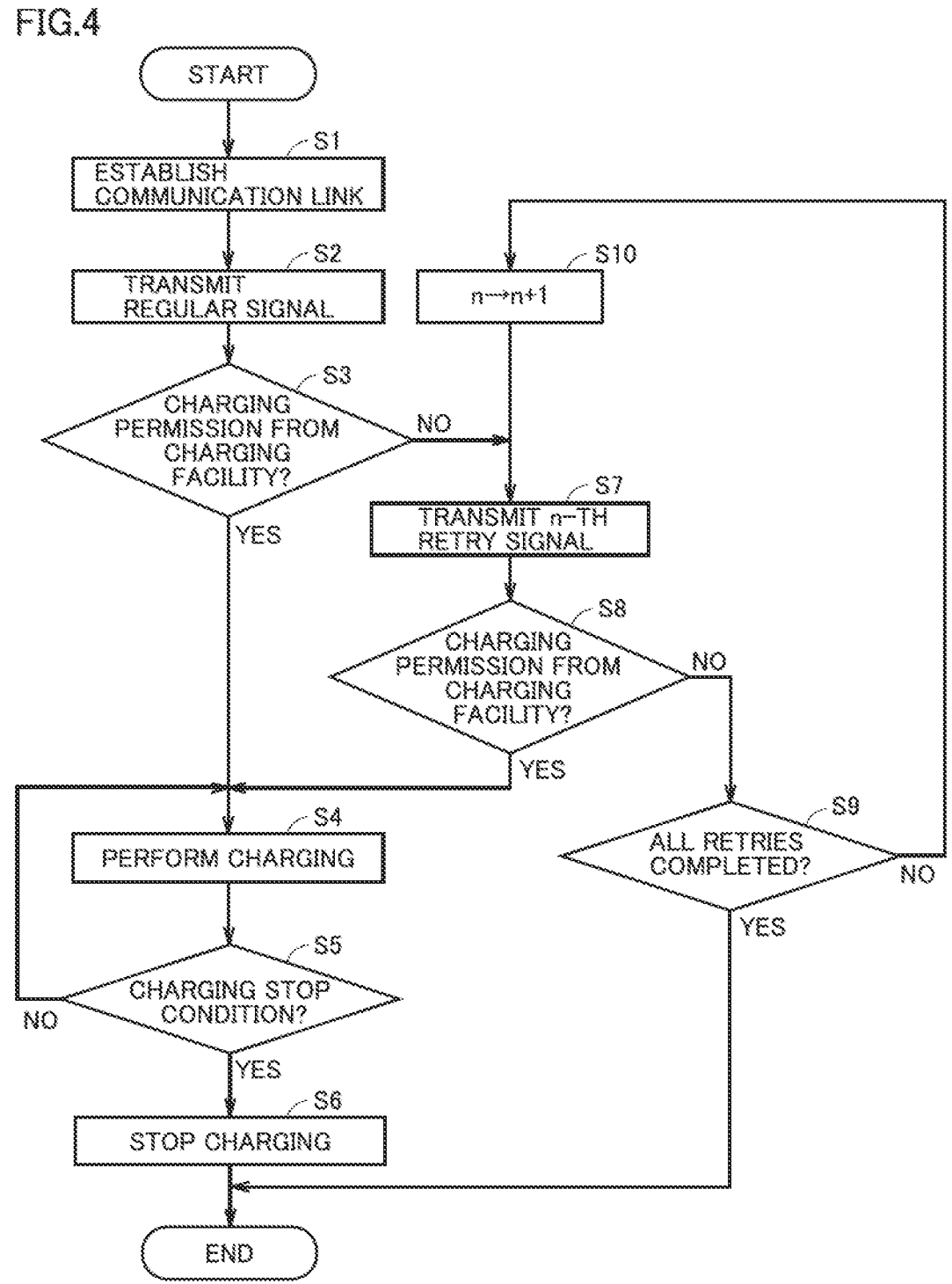
FIG. 4 is a flowchart showing a procedure of a communication sequence in this embodiment.

FIG. 4 is a flowchart showing a procedure of a communication sequence in this embodiment. A series of processes shown in this flowchart is performed when a predetermined condition is satisfied (for example, for each control cycle when vehicle 1 and charging facility 2 are connected by charging cable 3). While each step is implemented by software processing by ECU 10 of vehicle 1, it may be implemented by hardware (electric circuitry) disposed within ECU 10. A step is hereinafter abbreviated as "S".

In S1, vehicle 1 performs a handshake and mutual identification between vehicle 1 and charging facility 2, to establish a communication link between vehicle 1 and charging facility 2 (SQ1 to SQ4 in FIG. 3).

In S2, vehicle 1 transmits and receives regular signals to and from charging facility 2 in accordance with a communication sequence defined in a charging standard. Specifically, vehicle 1 transmits a signal (which may be a single combined signal or a plurality of divided signals) including a charging frame, a discharging frame and an optional frame to charging facility 2. The regular signal corresponds to "first signal" according to the present disclosure. Vehicle 1 also receives a signal including a charging frame, a discharging frame and an optional frame from charging facility 2 (SQ5 to SQ10 in FIG. 3).

In S3, vehicle 1 determines whether or not a charging permission message has been obtained from charging facility 2. When the charging permission message has been obtained (YES in S3), vehicle 1 starts the charging of vehicle 1 by transmitting a charging request message to charging facility 2 (S4, and SQ11 and SQ12 in FIG. 3).

In S5, vehicle 1 determines whether or not a predetermined charging stop condition is satisfied. The charging continues until the charging stop condition is satisfied (NO in S5), and when the charging stop condition is satisfied (YES in S5), vehicle 1 stops the charging of vehicle 1 by transmitting a charging stop message to charging facility 2 (S6, and SQ13 and SQ14 in FIG. 3).

Here, when the charging permission message has not been obtained from charging facility 2 in S3 (NO in S3), vehicle 1 proceeds to S7, and transmits an n-th retry signal (n=1 to 5, initial value n=1) to be described later to charging facility 2, to retry to obtain the charging permission message from charging facility 2. Each n-th retry signal corresponds to "second signal" according to the present disclosure.

In S8, vehicle 1 determines whether or not the charging permission message has been obtained from charging facility 2. When the charging permission message has been obtained (YES in S8), vehicle 1 proceeds to S4, and starts the charging of vehicle 1 by transmitting the charging request message to charging facility 2.

When the charging permission message has not been obtained from charging facility 2 (NO in S8), on the other hand, vehicle 1 determines whether or not all retries to obtain the charging permission message from charging facility 2 have been completed (S9). When there are still unsent retry signals (NO in S9), vehicle 1 increments n by 1 (S10), and transmits the n-th retry signal to charging facility 2 (S7). Once all of the retry signals have been transmitted, that is, when the charging permission message is not obtained even after the fifth retry signal is transmitted (YES in S9), vehicle 1 ends the series of processes.
<Retry Signal>

Figure 6:
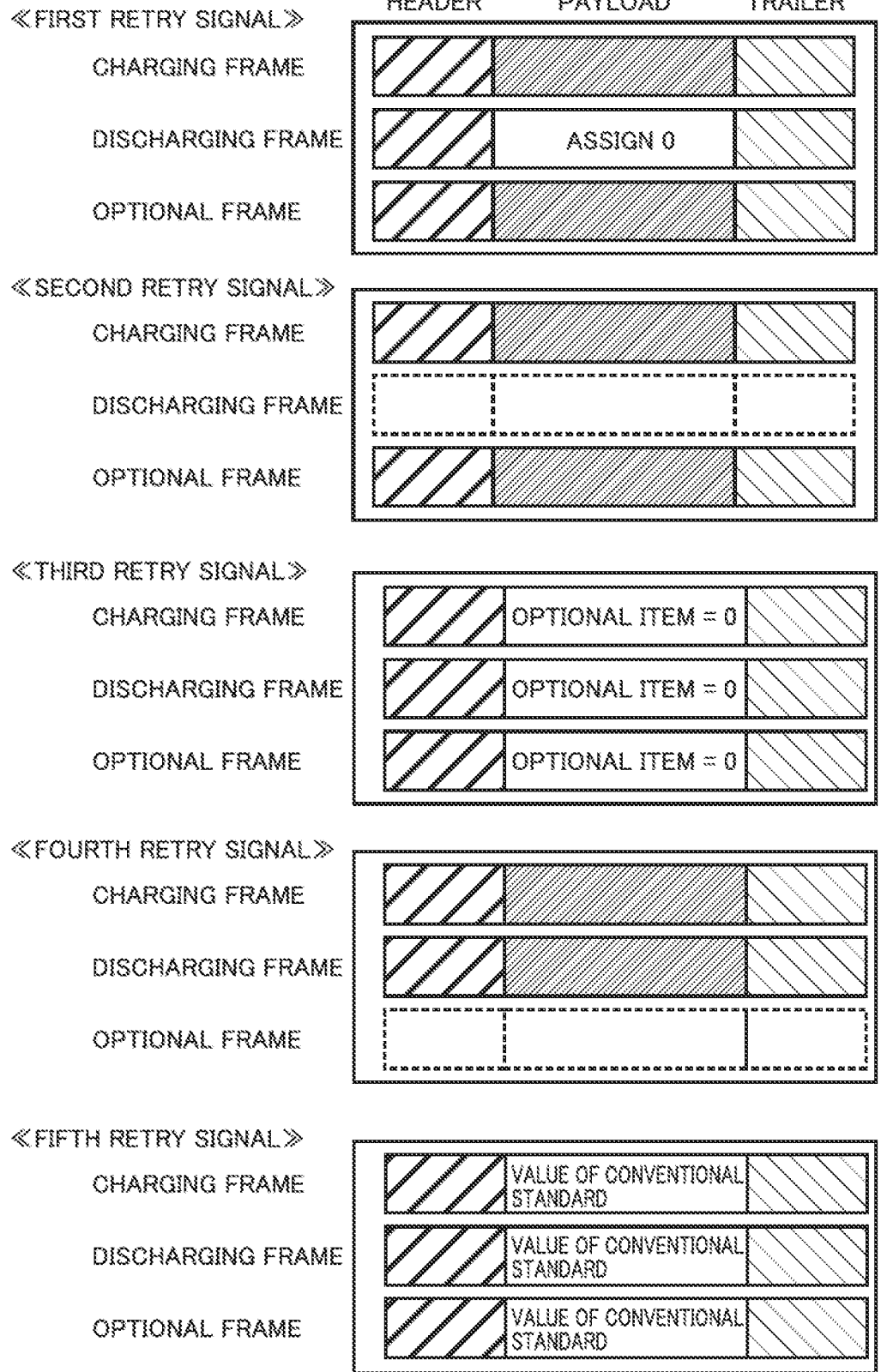
FIG. 6 schematically shows structures of frames included in the five types of retry signals.

FIG. 5 illustrates features of five types of retry signals. As described above, in the n-th retry signal, at least one of the charging frame, the discharging frame and the optional frame is different from a normal frame (the frame transmitted in the process of S2 in FIG. 4) included in a regular signal. FIG. 6 schematically shows structures of the frames included in the n-th retry signal. Referring to FIGS. 5 and 6, a retry signal includes a header for controlling a data destination and the like, a payload which is a data body, and a trailer for checking for data corruption and the like.

A first retry signal is a signal in which the payload of the discharging frame is set to an invalid value. The invalid value may be a value that may not be used in the normal frame, or a value outside a range defined in the charging standard (outside a regular range). The invalid value may be set as appropriate. While the invalid value is typically set to all zeros (8 bits are all zeros=0x00 in an example to be described later), the invalid value may be other values (for example, 8 bits are all ones=0xFF). When the invalid value is zero, the first retry signal includes a normal charging frame, a discharging frame whose payload is set to all zeros, and a normal optional frame.

A second retry signal is a signal in which the discharging frame is not transmitted. That is, the second retry signal includes a normal charging frame and a normal optional frame, and does not include the discharging frame.

A third retry signal is a signal in which an optional item (an item which is not essential in the charging standard) included in the payload of at least one of the charging frame and the discharging frame is set to an invalid value. If there are a plurality of optional items, only some of the optional items may be set to the invalid value, and the remaining optional items may be set to normal values. Alternatively, the payload of the optional frame may be set to the invalid value. The invalid value may be set as appropriate. While the invalid value is typically set to zero, the invalid value may be other values. When the invalid value is zero, the third retry signal includes a frame (which may be one type or two types) whose optional item is set to zero, and other normal frames.

A fourth retry signal is a signal in which the optional frame is not transmitted. That is, the fourth retry signal includes a normal charging frame and a normal discharging frame, and does not include the optional frame.

A fifth retry signal is a signal in which a part of the payload (items such as a charging condition and a discharging condition) of at least one of the three types of frames is set to a value that complies with a conventional charging standard (conventional standard). For example, in the payload of the charging frame, the upper limit value of a charging voltage and/or the upper limit value of a charging current are set to upper limit values that comply with the conventional standard. If there are a plurality of applicable items, only some of the items may be set to values of the conventional standard, and the remaining items may be set to normal values (values that comply with a new charging standard). The fifth retry signal includes a frame (which may be one type, two types, or three types) changed to comply with the conventional standard, and other normal frames.

It should be noted that it is not essential for the retry signal to include the discharging frame and the optional frame. For example, the first retry signal, the third retry signal and the fifth retry signal may include the charging frame and the discharging frame, and not include the optional frame. The second retry signal may include only the charging frame. The fourth retry signal may include only the charging frame.

As described above, in this embodiment, when the charging permission message is not obtained from charging facility 2 even after the regular signal is transmitted to charging facility 2 in accordance with the communication sequence defined in the charging standard, vehicle 1 transmits, to charging facility 2, the retry signal in which a part of the regular signal is modified. The retry signal is a signal in which a part of the regular signal that is not necessarily essential for charging, specifically, the optional item in the charging frame, the discharging frame, or the optional frame is changed or deleted. If charging facility 2 is able to process the retry signal, the interconnectivity between vehicle 1 and charging facility 2 may be ensured, and charging facility 2 may transmit the charging permission message to vehicle 1. According to this embodiment, therefore, vehicle 1 can be charged at many charging facilities 2.

It should be noted that the five types of retry signals are transmitted in the example described in FIGS. 4 to 6. However, vehicle 1 does not necessarily need to transmit all of the five types of retry signals to charging facility 2. Vehicle 1 may transmit only the first retry signal or only one of the other types of retry signals. Vehicle 1 may transmit only two to four types of retry signals. In other words, vehicle 1 only needs to transmit at least one of the five types of retry signals to charging facility 2. The order of transmission of the n retry signals from vehicle 1 to charging facility 2 can be changed as appropriate.

It is desirable that vehicle 1 transmit the first retry signal and/or the second retry signal before the third retry signal to the fifth retry signal. An older charging facility 2 that does not support the processing of a discharging frame may process the received discharging frame as, so to speak, noise. For such charging facility 2, interconnectivity is likely to be ensured by the transmission of the first retry signal or the second retry signal. As a result, the time required for exchanging the retry signals can be reduced because the third to fifth retry signals need not be transmitted once the interconnectivity has been ensured.

It is desirable that vehicle 1 transmit the third retry signal and/or the fourth retry signal before the fifth retry signal. This is because, in an older charging facility 2, the possibility of interconnectivity being ensured by setting the optional item to an invalid value or by not transmitting the optional frame is higher than the possibility of interconnectivity being ensured by setting a conventional standard value.

Vehicle 1 may, for example, transmit the first retry signal, the third retry signal, and the fifth retry signal in this order. Stated another way, vehicle 1 may omit transmitting the second retry signal and the fourth retry signal. In this case, the only change needed is to replace a part of the payload with another value (an invalid value or a conventional standard value), and therefore, software (program) can be readily implemented in ECU 10 of vehicle 1 as compared to when the entire frame is deleted.

EXAMPLE

This example describes an exemplary configuration in which vehicle 1 and charging facility 2 communicate in accordance with a CAN protocol in a CHAdeMO system.

Figure 7:
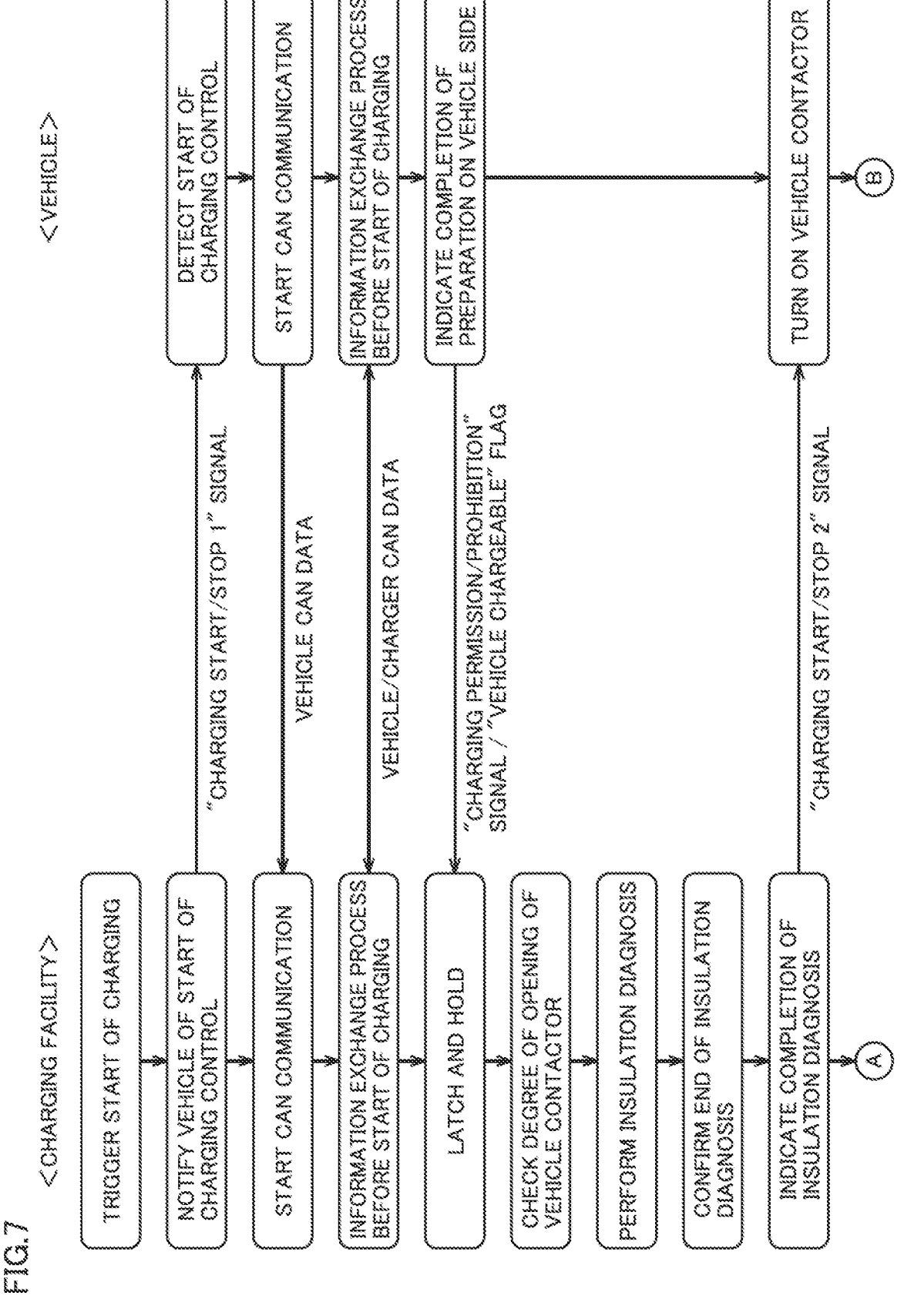
FIG. 7 is a flowchart showing a procedure of a communication sequence in accordance with a CAN protocol in a CHAdeMO system.

FIG. 7 is a flowchart showing a procedure of a communication sequence in accordance with the CAN protocol in the CHAdeMO system. FIG. 8 is a flowchart showing a continuation of the procedure shown in the flowchart of FIG. 7. In CHAdeMO, the three types of frames described above are transmitted in an information exchange process before the start of charging.

Figure 9:
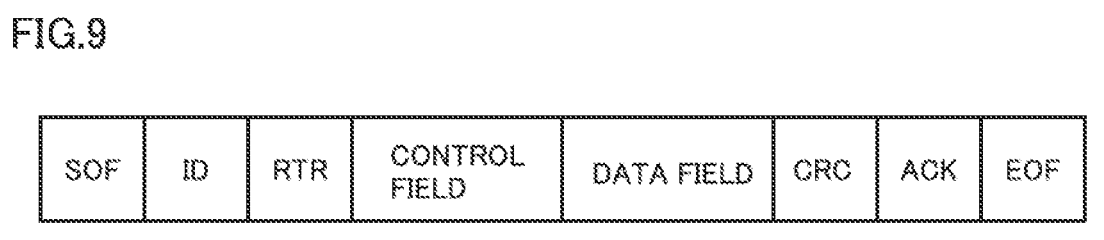

FIG. 9 shows an overview of a frame structure in the CAN protocol. Each of the three types of frames includes an SOF (Start Of Frame); an identifier ID that indicates a data content, identification of a transmitting node, priority of communication arbitration and the like; an RTR (Remote Transmission Request) that indicates a frame type (distinction between a data frame and a remote frame); a control field that indicates the number of bytes (DLC: Data Length Code) in a data field; a data field; a frame check sequence using CRC (Cyclic Redundancy Check); an acknowledgement ACK for a receiving node to respond; and an EOF (End Of Frame). It should be noted that the SOF, the ID, the RTR and the control field correspond to the header shown in FIG. 6. The data field corresponds to the payload. The CRC, the ACK and the EOF correspond to the trailer.

FIG. 10 is a first diagram illustrating the n-th retry signal in this example. Frames with identifier IDs in the 100s (100 to 102) are charging frames. Frames with identifier IDs in the 200s (200 and 201) are discharging frames. FIG. 11 shows details of the discharging frames.

Referring to FIGS. 10 and 11, vehicle 1 may assign, to the zeroth byte of the data field included in the charging frame with ID=102, the number of a conventional standard as a charge sequence management number. Vehicle 1 may assign, to the first to third bytes of this data field, values of the conventional standard as a charging voltage upper limit value and a charging current upper limit value. As a specific example, the charging current upper limit value may be changed from 400 A to 125 A. These are examples of the fifth retry signal.

Vehicle 1 may assign, to the zeroth to seventh bytes of the data field included in the discharging frame with ID=200, an invalid value such as all zeros. This is an example of the first retry signal. Vehicle 1 may not transmit the discharging frame with ID=200. This is an example of the second retry signal. Vehicle 1 may assign values of the conventional standard as a discharging current upper limit value in the zeroth byte and a discharging voltage lower limit value in the fourth and fifth bytes of this data field. These are examples of the fifth retry signal. Vehicle 1 may assign, to a charging upper limit of remaining battery capacity in the seventh byte of this data field, an invalid value such as zero. This is an example of the third retry signal.

Similarly, vehicle 1 may assign an invalid value to the zeroth to seventh bytes of the data field included in the discharging frame with ID=201. This is another example of the first retry signal. Vehicle 1 may not transmit the discharging frame with ID=201. This is another example of the second retry signal. Vehicle 1 may assign, to the zeroth byte of this data field, the number of the conventional standard as a V2H charging/discharging sequence management number. This is another example of the fifth retry signal. Vehicle 1 may assign an invalid value to an estimated completion time of discharging in the first and second bytes and/or to an amount of electric power that can be supplied by the vehicle in the third and fourth bytes of this data field. These are other examples of the third retry signal.

FIG. 12 is a second diagram illustrating the n-th retry signal in this example. Frames with identifier IDs in the 700s (710 to 712, and 718) are optional frames for indicating the vehicle ID or service code. Vehicle 1 may assign an invalid value such as all zeroes to the zeroth to seventh bytes of the data field included in the optional frame with ID=710. The same is true for the other optional frames with IDs=711, 712 and 718. These are other examples of the third retry signal. Alternatively, vehicle 1 may not transmit the optional frames with IDs=710 to 712, and 718. This is an example of the fourth retry signal.

It should be noted that the retry signal described in FIGS. 10 to 12 is merely exemplary, and retry signals can also be generated by modifying other items.

While the CHAdeMO system has been described in this example, charging standards to which the present disclosure is applicable are not limited to the CHAdeMO system. The present disclosure is also applicable to other quick-charging standards such as the GB/T system, the combo system (CCS1/CCS2), and the Tesla system. Those skilled in the art could readily understand which frames of the other quick-charging standards should be modified (changed or deleted) in accordance with the present disclosure.

Although an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle controller that performs control for charging a power storage device mounted on a vehicle with electric power supplied from a charging facility provided outside the vehicle, the vehicle controller comprising:

a processor that controls transmission and reception of signals to and from the charging facility in accordance with a communication sequence defined in a charging standard, wherein the processor transmits, to the charging facility, a first signal for obtaining a charging permission from the charging facility, prior to a start of electric power supply from the charging facility to the vehicle, the first signal includes a charging frame indicating a charging condition from the charging facility to the vehicle and a discharging frame indicating a discharging condition from the vehicle to the charging facility, a difference between the first signal and a second signal in which a part of the first signal is modified in order to retry to obtain the charging permission is the discharging frame, the discharging condition in the second signal is set to a value outside a range defined in the charging standard, and the processor starts charging control of the power storage device by the electric power supply from the charging facility, when the charging permission is obtained, and transmits, to the charging facility, the second signal in which the part of the first signal is modified in order to retry to obtain the charging permission, when the charging permission is not obtained.

2. The vehicle controller according to claim 1, wherein the discharging condition includes at least one of a lower limit value of a discharging voltage, an upper limit value of a discharging current, a discharging lower limit of remaining battery capacity, and a discharging sequence management number, each of which is defined in the charging standard.

3. The vehicle controller according to claim 1, wherein the first signal further includes a supplemental frame indicating an optional condition defined as not being essential in the charging standard, and a difference between the first signal and the second signal is the supplemental frame.

4. The vehicle controller according to claim 3, wherein the second signal includes the charging frame and the supplemental frame, and the optional condition in the second signal is set to an invalid value.

5. The vehicle controller according to claim 3, wherein the second signal includes the charging frame, and does not include the supplemental frame.

6. The vehicle controller according to claim 3, wherein the optional condition includes at least one of an identification number and a service code of the vehicle.

7. The vehicle controller according to claim 1, wherein at least one of the charging condition and the discharging condition in the first signal includes an optional item defined as not being essential in the charging standard, and a difference between the first signal and the second signal is the optional item.

8. The vehicle controller according to claim 7, wherein the second signal includes the charging frame and the discharging frame, and the optional item in the second signal is set to an invalid value.

9. The vehicle controller according to claim 7, wherein the optional item includes at least one of a charging upper limit of remaining battery capacity, an estimated completion time of discharging, and an amount of electric power that can be supplied by the vehicle.

10. The vehicle controller according to claim 1, wherein a difference between the first signal and the second signal is a difference between information defined in the charging standard and information defined in a second standard that was standardized before the charging standard.

11. The vehicle controller according to claim 10, wherein the first signal includes a charging sequence management number of the charging standard, and the second signal includes a charging sequence management number of the second standard.

12. The vehicle controller according to claim 10, wherein the first signal includes at least one of a first upper limit value of a charging voltage and a first upper limit value of a charging current, each of which is defined in the charging standard, and the second signal includes at least one of a second upper limit value of the charging voltage and a second upper limit value of the charging current, each of which is defined in the second standard.

13. The vehicle controller according to claim 1, wherein the processor transmits a third signal to the charging facility, when the charging permission is not obtained even after the second signal is transmitted to the charging facility, transmits a fourth signal to the charging facility, when the charging permission is not obtained even after the third signal is transmitted to the charging facility, and transmits a fifth signal to the charging facility, when the charging permission is not obtained even after the fourth signal is transmitted to the charging facility, the first signal further includes a discharging frame indicating a discharging condition from the vehicle to the charging facility, and a supplemental frame indicating an optional condition defined as not being essential in the charging standard, at least one of the charging condition and the discharging condition in the first signal includes an optional item defined as not being essential in the charging standard, a difference between the first signal and the second signal is the discharging frame, a difference between the first signal and the third signal is the supplemental frame or the optional item, and a difference between the first signal and the fourth signal is a difference between information defined in the charging standard and information defined in a second standard that was standardized before the charging standard.

14. A vehicle comprising the vehicle controller according to claim 1.

15. A method for controlling a vehicle, for charging a power storage device mounted on the vehicle with electric power supplied from a charging facility provided outside the vehicle, the method comprising:

transmitting and receiving signals between the vehicle and the charging facility in accordance with a communication sequence defined in a charging standard, wherein the transmitting and receiving includes transmitting, from the vehicle to the charging facility, a first signal for obtaining a charging permission from the charging facility, prior to a start of electric power supply from the charging facility to the vehicle, wherein the first signal includes a charging frame indicating a charging condition from the charging facility to the vehicle and a discharging frame indicating a discharging condition from the vehicle to the charging facility, wherein a difference between the first signal and a second signal in which a part of the first signal is modified in order to retry to obtain the charging permission is the discharging frame, and wherein the discharging condition in the second signal is set to a value outside a range defined in the charging standard, starting the electric power supply from the charging facility, when the vehicle obtains the charging permission, and transmitting, from the vehicle to the charging facility, the second signal in which the part of the first signal is modified in order to retry to obtain the charging permission, when the vehicle does not obtain the charging permission.

* * * * *